United States Patent [19]

Leduc

[11] 4,109,947
[45] Aug. 29, 1978

[54] LATCH ASSEMBLY FOR FILM LOADING DOOR

[75] Inventor: Robert D. Leduc, Marlborough, Mass.

[73] Assignee: Polaroid Corporation, Cambridge, Mass.

[21] Appl. No.: 793,075

[22] Filed: May 2, 1977

[51] Int. Cl.² ............................................. E05C 19/02
[52] U.S. Cl. ...................... 292/76; 292/263; 292/228; 292/336.3; 354/288
[58] Field of Search .................. 292/263, 78, 79, 76, 292/77, DIG. 65, 228, 336.3; 354/288, 174

[56] References Cited

U.S. PATENT DOCUMENTS

| | | | |
|---|---|---|---|
| 1,713,407 | 5/1929 | Swanson | 292/263 X |
| 2,242,895 | 5/1941 | Roe | 292/76 X |
| 3,093,258 | 6/1963 | Turner | 292/263 X |
| 4,000,500 | 12/1976 | Ivester et al. | 354/174 |

*Primary Examiner*—Richard E. Moore
*Attorney, Agent, or Firm*—Alfred E. Corrigan

[57] ABSTRACT

A latch assembly for releasably securing a door in closing relation to an open end of a chamber. The latch assembly includes two latching members, one of which is mounted adjacent the open end of the chamber and the other is mounted on the door such that it moves in a plane as the door is moved between its open and closed positions. The one member has a surface which is inclined in two directions to the aforementioned plane such that should a predetermined force be exerted upon the door in an effort to move it from its closed position without actuating the latch assembly release, the latching member mounted on the door will cam the inclined surface so as to move it in a plane which defines an angle with the aforementioned plane thereby unlatching the assembly before any damage is caused to the assembly or door.

4 Claims, 5 Drawing Figures

LATCH ASSEMBLY FOR FILM LOADING DOOR

BACKGROUND OF THE INVENTION

1. Field of the Invention

This invention relates to photographic apparatus and more particularly to a latch assembly for a loading door.

2. Description of the Prior Art

Photographic apparatus, for example cameras, are generally provided with a film loading door which is mounted to a camera housing for movement between an open position wherein a film assemblage, e.g., a film cassette containing one or more film units, may be inserted into a film chamber of the camera and a closed position. The door is usually held or maintained in the closed position by a latch assembly comprised of a least two latching members, one of which is mounted on the door for movement therewith while the other latching member is mounted on the main body of the camera. A manually operable latch assembly actuator is provided for moving one of the latching members out of latching engagement with the other member thereby permitting the door to be moved to its open position. It has been found that sometimes the operator of such cameras may attempt to move the door from its closed position to its open position prior to depressing or otherwise actuating the latch assembly actuator. Often, the force applied to the door during such attempt has been great enough to damage the latch assembly and or door.

U.S. Pat. No. 4,000,500 suggests one possible solution to the aforementioned problem. It appears from the penultimate paragraph of the specification of said patent that the latching members are constructed such that when they are in the latched or locked position there is a built-in threshold torque which, if exceeded by an inadvertently applied torque to the door in an attempt to open it without operating the latch assembly release button, will allow the system to become unlatched without failing of any of its parts. It appears from the foregoing and from an inspection of FIG. 4 of said patent that the rotatably mounted latching member on the film loading door is cammed by the stationary latching member in a counterclockwise direction out of latching engagement therewith by such inadvertently applied torque. However, since it appears that the movable latching member of the patent always moves in the same plane during such unlatching, it would also seem to follow that the tolerances of the latching system must be kept within close limits in order for the system to operate as described. In other words the system described in the aforementioned patent is not very forgiving when it comes to deviations in manufacturing tolerances, which deviations, although by themselves may be within their individual limits, may add to a final tolerance deviation which is not economically feasible.

SUMMARY OF THE INVENTION

The instant invention relates to photographic apparatus, e.g., cameras of the type having a door releasably secured in closing relation to an open end of a chamber, e.g., a film chamber. A latch assembly comprising first and second latching members is provided for securing the door in closing relation with the open end of the chamber. A latch assembly release, when manually operated or actuated, moves one of the latching members out of latching engagement with the other member to permit the door to be moved to an open position in which an object such as a film assemblage may be inserted into or removed from the chamber by way of the aforementioned open end.

The latch assembly is constructed such that if one were to apply a predetermined force to the door in an effort to move it from its closed position to its open position without actuating the latch assembly release, the two latching members would coact with each other to unlatch themselves to permit such movement of the door before any damage is done to the latch assembly and/or the door. Specifically, one of the latching members has a surface which is adapted to be cammed by the other latching member out of latching engagement therewith during such attempted movement of the door. The cammed surface of the one latching member is inclined in two directions relative to a plane that the other latching member moves in as the door is moved from the closed position to the open position. By so inclining said surface the one latching member may now be cammed in any direction between one which lies in a plane perpendicular to the plane of movement of the other latching member to one which lies in a plane parallel with the plane of movement of the other latching member, the particular direction being a function of tolerance variations in the latch assembly.

An object of the invention is to provide photographic apparatus of the type having a loading door which is normally unlatched for movement from a closed position to an open position by manual operation of a latch assembly release with a latch assembly that includes a member which is movable in a plurality of directions for automatically unlatching the assembly when a predetermined force is applied to the loading door in an effort to move it from its closed position to its open position without operating the latch assembly release, such predetermined force being less than that required to cause damage to the latch assembly or to the loading door.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be made to the following detailed description taken in connection with the accompanying drawings wherein.

DETAILED DESCRIPTION OF THE INVENTION

Figure 1:
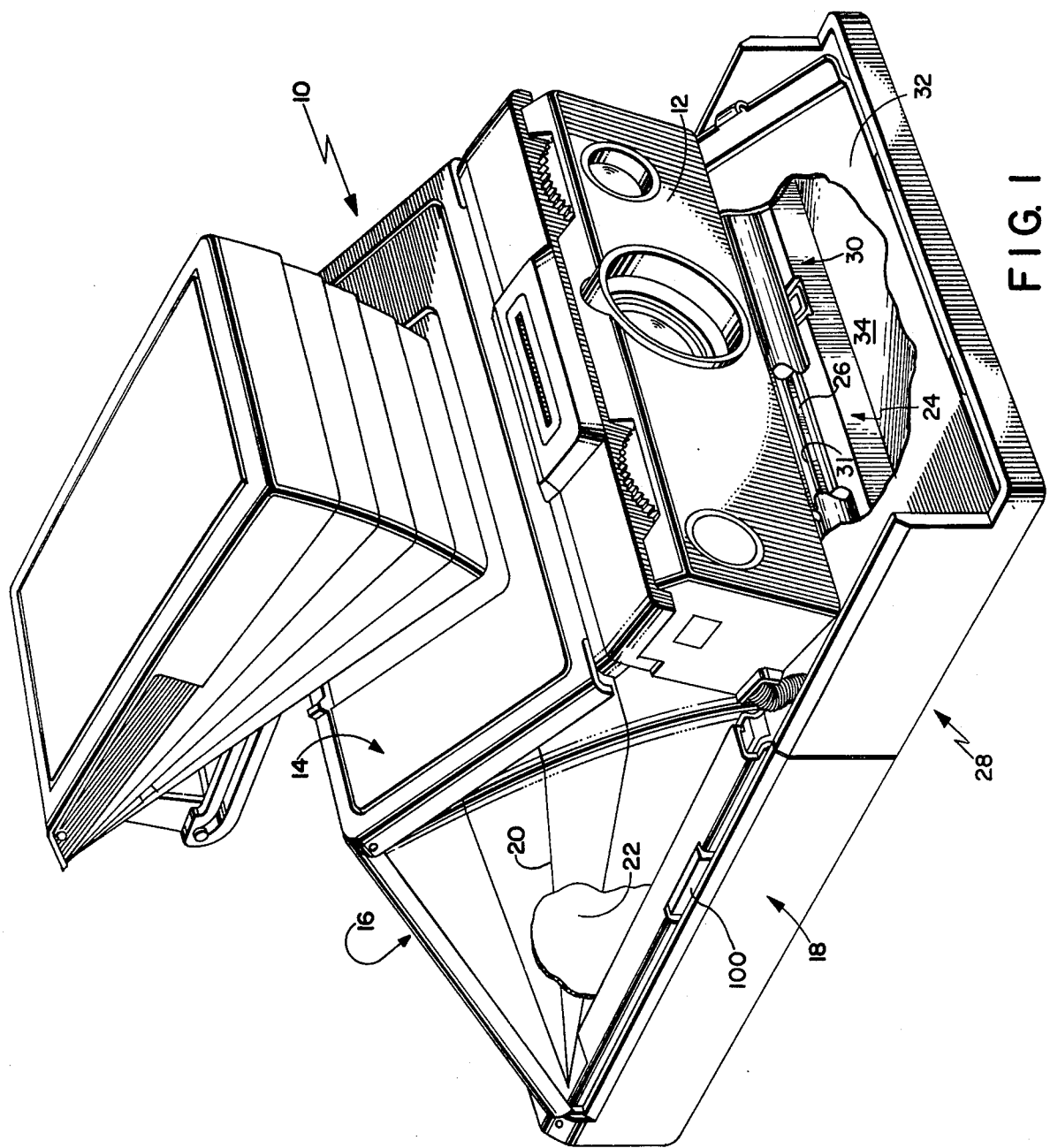
FIG. 1 is a perspective view of photographic apparatus embodying the instant invention with select portions broken away to more clearly show internal details.

Reference is now made to FIG. 1 of the drawings wherein is shown photographic apparatus in the form of a camera 10 which incorporates the instant invention. The camera 10 includes a plurality of housing sections 12, 14, 16 and 18 which cooperate with a bellows 20 to define a film chamber 22 having an open end 24 through which a film cassette 26 containing at least one film unit may be inserted into or removed from its exposure position within the film chamber 22. The open end 24 of the film chamber 22 is adapted to be closed by a loading door 28, which in the embodiment disclosed includes suitable means for mounting a fluid spreading apparatus 30 which is adapted to spread a processing fluid across an exposed photosensitive element of the film unit as it is advanced from its exposure position within the film cassette 26 via an opening 31. As the exposed film unit exits from between the gap defined by the rollers of the apparatus 30 its leading edge is deflected by an opaque deflector 32 such that a portion of the film unit emerges from the camera via an opening (not shown) in a bottom wall 34 of the loading door 28, as is well known in the art.

Figure 2:
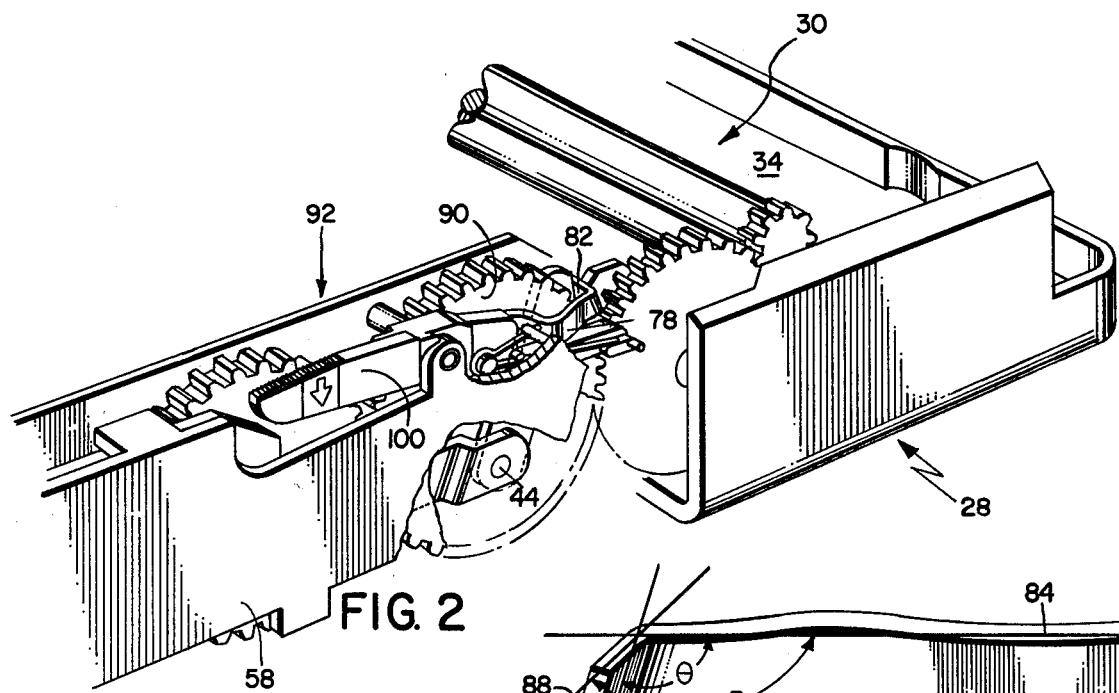
FIG. 2 is an enlarged fragmentary perspective view of a portion of the apparatus shown in FIG. 1, illustrating a latch assembly in a latched position.
Figure 3:
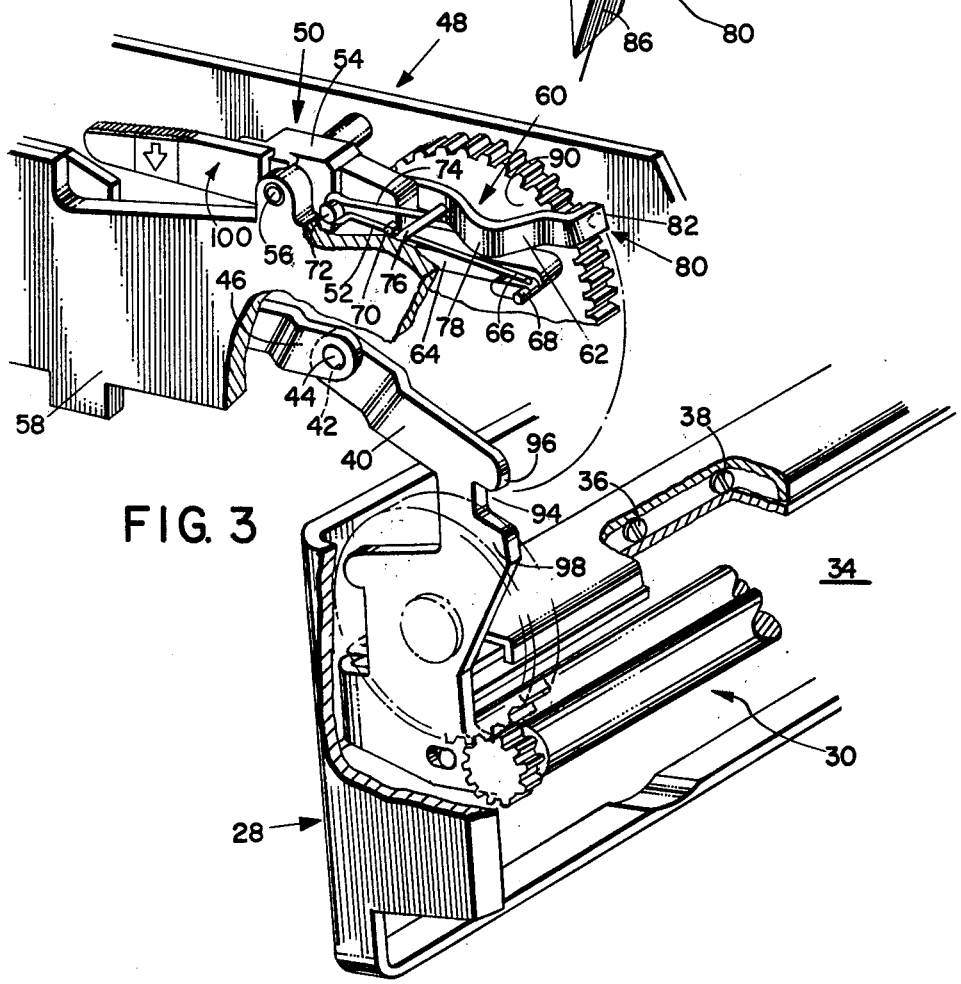
FIG. 3 is a view similar to FIG. 2, showing the latch assembly in an unlatched position.

The fluid spreading apparatus 30 is secured to the bottom wall 34 of the loading door 28 by a pair of screws 36 and 38, or by other suitable means. The apparatus includes a pair of arms 40 (only one of which is shown) located adjacent the ends of the spread rollers. The free end of each arm 40 includes a hole 42 for receiving a lug 44 mounted on a support bracket 46 (only one of which is shown) for pivotally coupling the spreading apparatus 30 and the loading door 28 to the remainder of the camera for movement between a first or closed position, as shown in FIGS. 1 and 2, wherein the loading door 28 and its associated structure, i.e., the spreading apparatus 30 and the deflector 32, extend across the open end 24 of the film chamber 22, and a second or open position, as shown in FIG. 3, wherein a film cassette may be inserted into or removed from the film chamber 22 via the open end 24.

The camera 10 includes a latch assembly for releasably securing the loading door 28 in the aforementioned first or closed position. The latch assembly is best shown in FIG. 3 and includes first means 48 mounted adjacent the open end 24 of the film chamber 22 and second means, namely, the aforedescribed arm 40. The first means 48 includes a latching arm 50 and a hairpin like spring 52 for biasing the latching arm 50 into its latched position, as shown in FIG. 2. The latching arm 50 is configured having a portion 54 pivotally supported by a pin 56 mounted in a support plate 58, and a bifurcated extension 60 comprised of first and second extension members 62 and 64.

As mentioned previously, the latching arm 50 is biased in a clockwise manner about the pivot 56 into its latched position by a spring 52. The spring 52 has one of its ends 66 in abutting overlying relationship with a pin extension 68 of the second extension member 64. The spring 52 extends below a pin 70 formed on extension member 64 and then about a second pin extension 72 formed as a portion of the latching arm 50. The remaining leg 74 of the spring 52 is captured beneath an inwardly extending pin extension 76 formed on the inward side of the support plate 58.

The first extension member 62 includes means specifically designed to permit the selective latching and unlatching operations discussed previously. In this regard, additional reference should be made to FIGS. 4 and 5. The member 62 extends in a direction generally parallel to the second extension member 64 and is preferably configured of a resilient spring steel material having an outwardly extending bend 78 and terminates in an end portion 80, the specific configuration of which is of the uppermost importance. The end portion 80 is formed having a generally planar surface 82 facing toward the pivot pin 56 of the arm 50. The specific configuration of the surface 82 may be best evidenced by referring to FIG. 4.

Figure 4:
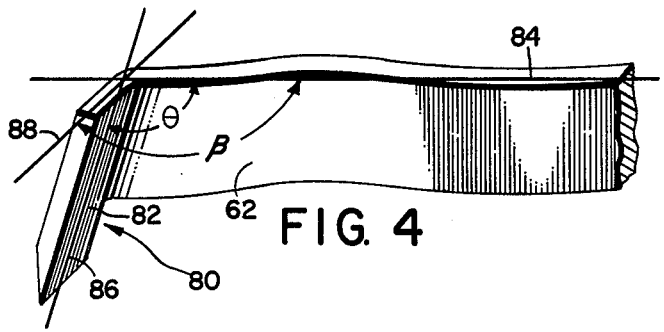
FIG. 4 is a perspective view of an end portion of one of the latching members of the latch assembly shown in FIGS. 2 and 3.

FIG. 4 is an enlarged perspective view of the end portion 80 of the first extension member 62 as viewed from the inside of the camera looking outwardly. As may be evidenced from FIG. 4, the surface 82 is oriented in a non-orthogonal relation with respect to the general line of the extension of the member 62 without the bend 78. This non-orthogonal arrangement is present in two directions. Firstly, the plane of the surface 82 is pitched relative to a line 84 extending along the member 62. This angle of pitch $\phi$, as shown between the line 84 and a second line 86 is approximately 110 degrees. Secondly, the plane of the surface 82 is canted slightly with respect to the line 84 beyond the orthogonal to a position in which it lies along a third line 88, the angle between the lines 84 and 88 being designated B. The angle B measures slightly more than 90 degrees and is preferably established at 92 degrees.

As shown in FIGS. 2 and 3, the end of the first extension member 62 containing the surface 82 extends toward the interior of the camera, passing over a gear 90 which forms a part of a gear train 92 which is coupled between the camera's motor (not shown) and one of the spread rollers of the fluid spreading apparatus 30, and being located in position to be engaged by the second means 40 of the latch assembly. Specifically, the arm 40 includes a cut out portion 94 defined by a pair of shoulders 96 and 98 for receiving the inwardly turned end portion 80 so as to releasably secure the loading door in its closed position. In other words, as the loading door is pivoted in a counterclockwise manner from the position shown in FIG. 3 to that shown in FIG. 2, the shoulder 96 moves in a first plane which is substantially parallel with the line 84 until it engages and cams the end portion 80 upwardly in a counterclockwise direction against the bias of the spring 52 until the shoulder 96 reaches a position wherein the end portion 80 can drop into the cut out portion 94 under the clockwise bias of the spring 52, thereby latching the loading door 28 in its closed position.

Figure 5:
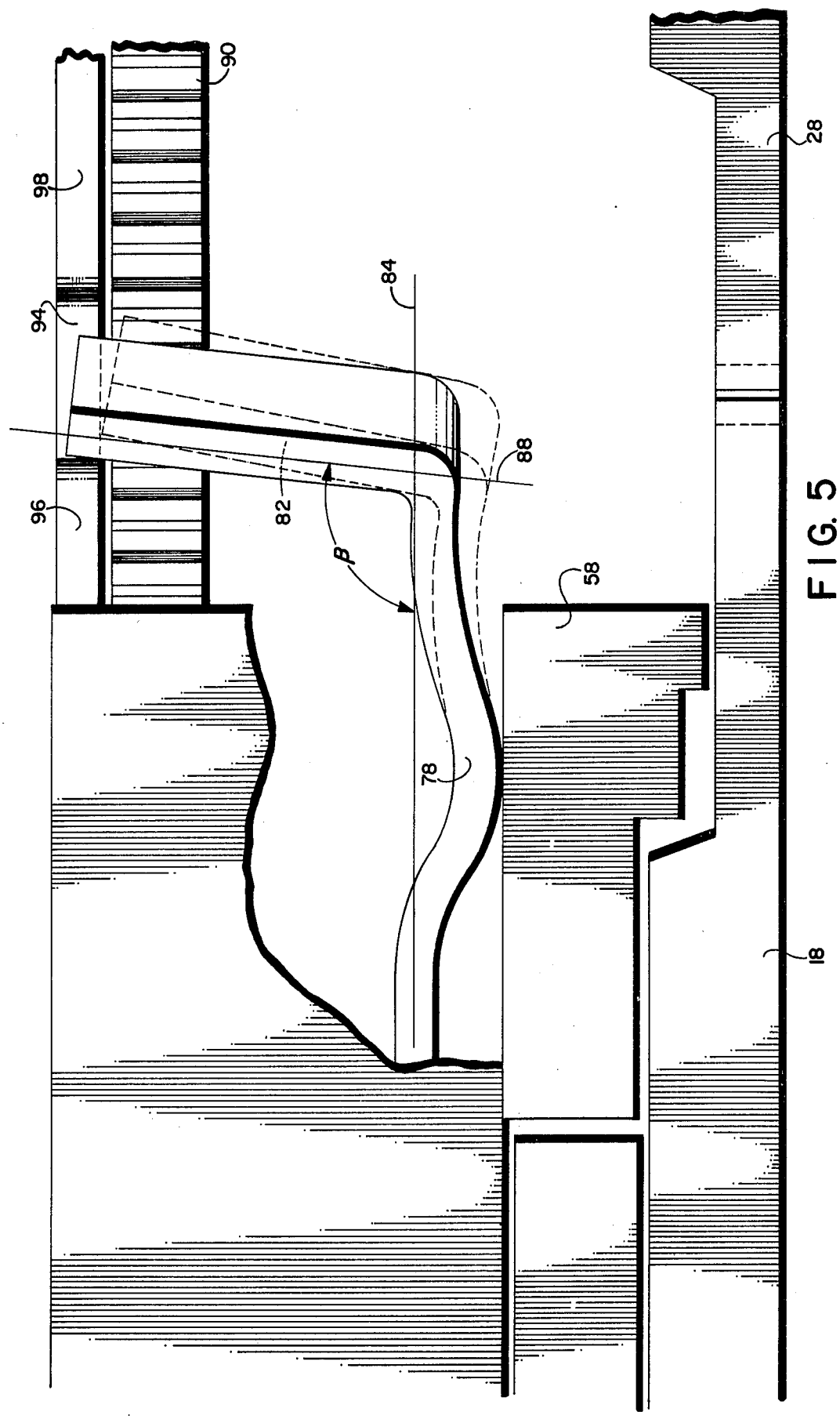
FIG. 5 is an enlarged top elevational view of the latch assembly, portions being broken away to more clearly reveal internal detail.

If the operator of the camera desires to move the loading door 28 to its open position so as to permit a film cassette 26 to be inserted into the film chamber 22 he merely actuates or depresses a latch assembly release 100. The release 100 is suitably connected to the first means 48 of the latch assembly such that depression thereof rotates the end portion 80 in a counterclockwise direction until it leaves the cut out portion 94 of the second means 40 of the latch assembly thereby unlatching the door 28 for movement into its open position. If, instead of actuating the release 100, the operator of the camera attempts to move the loading door 28 from its closed position to its open position by applying a downwardly directed force to the loading door, the latch assembly will automatically unlatch itself before the force reaches a magnitude large enough to cause damage to the latch assembly or the door 28. Specifically, as the force is applied to the loading door 28 a slight rotation in a clockwise direction occurs. During such rotation the portion of the shoulder 96 facing the cut out portion 94 engages (if it is not already in engagement) the surface 82 and starts to cam it to a position wherein the end portion 80 will no longer be in latching engagement with the cut out portion 94. The direction in which the end portion 80 and its inclined surface 82 are cammed by such attempt may vary between one which lies in a plane parallel to the plane in which the shoulder 96 travels during opening movement of the loading door 28 to one which lies in a plane which is perpendicular to the plane in which the shoulder 96 travels. An example of the latter is shown in FIG. 5 of the drawings wherein, during such attempt to open the loading door 28 without depressing the latch assembly release 100, the shoulder 96 cams the surface 82 of the end portion 80 such that the latter travels in a plane which is substantially perpendicular to the plane in which the shoulder 96 travels during opening movement of the loading door until it reaches the dotted line position wherein unlatching occurs. The particular direction in which the end portion 80 is cammed is a function of the angles $\phi$ and B and their relation with the plane in which the shoulder 96 moves. For example, it can be seen that if the angle B in FIG. 4 were to be decreased towards a value of 90° the resulting direction of movement of the end portion 80 during such camming action would be more away from a horizontal plane than would occur when the value of B was 92°. Similarly, changing the value of the angle $\phi$ will also affect the direction in which the end portion 80 moves to its unlatching position. Accordingly, it can be seen that the manufacturing tolerances of the system need not be as tightly controlled as heretofore.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:

a housing including means for defining a chamber having an opening through which an object is adapted to be inserted;

a door coupled to said housing for movement in a first plane between a first position wherein said door is in closed relation with said opening and a second position wherein said door is in open relation with said opening such that the object may be inserted into said chamber via said opening;

a latch assembly actuator;

a latch assembly for securing said door in said first position, said latch assembly including first means mounted on said housing and including a surface being inclined in first and second directions relative to said first plane, and second means mounted on said door so as to be in latching engagement with each other when said door is in said first position thereby latching said door to said housing in closing relation to said opening, said first means being movable out of latching engagement with said second means in response to manual actuation of said latch assembly actuator to permit movement of said door toward said second position, and said second means being movable out of latching engagement with said first means when a predetermined force is exerted upon said door during an attempt to move said door out of said first position and toward said second position prior to manually actuating said latch assembly actuator by camming said surface so as to move said first means in a plane which defines an angle with said first plane thereby preventing damage to said latch assembly or said door; and means for resiliently urging said first means into latching engagement with said second means when said door is in said first position.

2. Photographic apparatus as defined in claim 1 wherein said door is pivotally coupled to said housing such that rotation of said door by said predetermined force causes said second means to cam said surface of said first means in a direction away from said first plane.

3. Photographic apparatus as defined in claim 1 wherein said first means includes a resilient section for urging said surface of said first means to a position wherein it is located in the path of travel that said second means takes as said door is moved back to said first position such that as said door is about to enter said first position said second means engages and cams said first means in a direction against the bias of said resilient means until said second means contacts said surface, at which point said resilient means moves said surface into latching engagement with said second means to releasably secure said door in said first position.

4. Photographic apparatus as defined in claim 1 wherein said angle is substantially 90°.

* * * * *